INVENTOR
GEORGE NOMARSK
GERARD ROBLIN

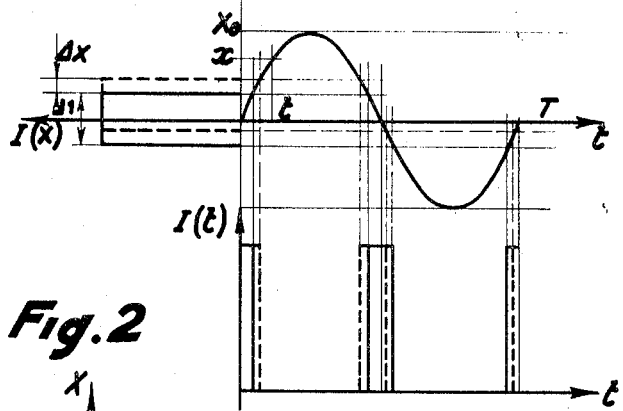
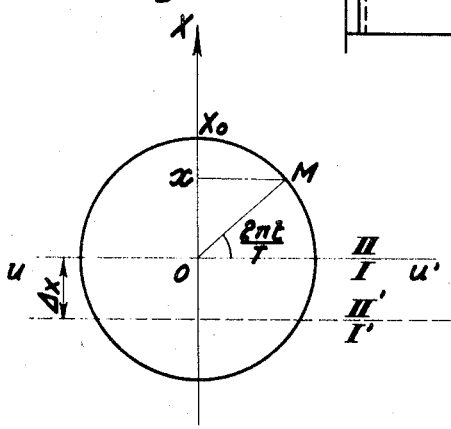
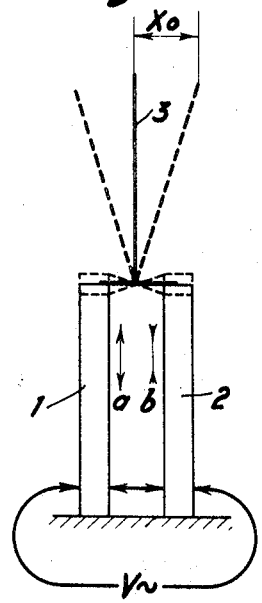
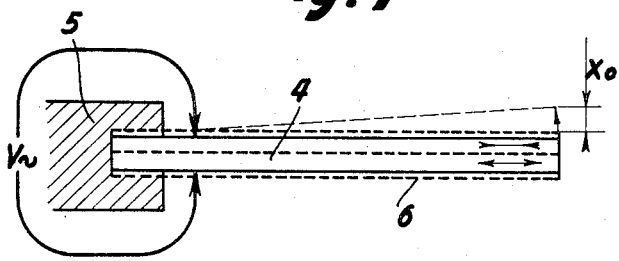
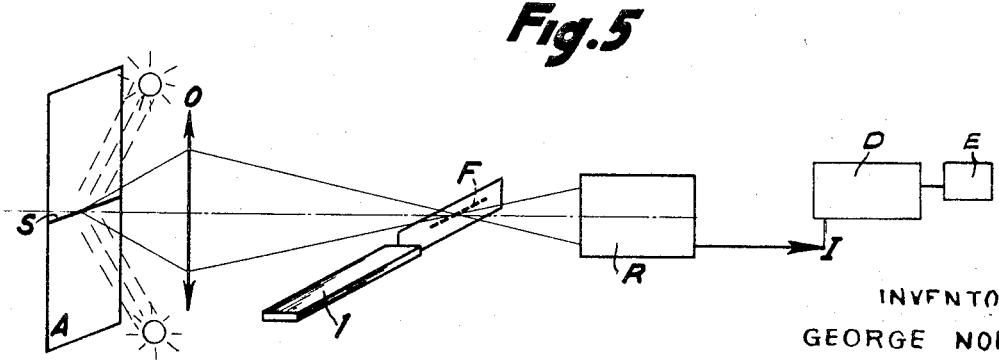

United States Patent Office 3,525,873
Patented Aug. 25, 1970

3,525,873
VIBRATING SLIT PHOTOELECTRIC
LOCATION DEVICE
Georges Nomarski, Bourg la Reine, and Gerard Roblin, Ivry-sur-Seine, France, assignors to Etablissement Public: Centre National de la Recherche Scientifique, Anatole, France, a corporation of France
Filed July 5, 1966, Ser. No. 562,724
Claims priority, application France, July 5, 1965, 23,497
Int. Cl. B41f *1/10;* G01h *21/30*
U.S. Cl. 250—235                    6 Claims

ABSTRACT OF THE DISCLOSURE

A periodic electric voltage is applied to a piezo-electric element on which is mounted a light control element, i.e. a slit or polarizer, which vibrates with the piezo-electric element. A surface with a discontinuity to be located is positioned on one side of the vibrating element. A photoelectric cell is positioned on the other side of the vibrating element. By comparing cell produced energy for each positive and negative movement of the slit, the discontinuity on the surface is precisely located.

---

The present invention relates to a photoelectric location device adapted to indicate with precision the position of lines or bands, such as: clear lines on a dark background, dark lines on a clear background, rectilineal boundaries between two clear and dark zones, multi-wave interference fringes, two-wave interference fringes etc.

The requirements in metrology techniques, both in industry and in the laboratory, leads to using aim setting microscopes, the simplest and best known method used in this connection being to visually appreciate the overlapping of the line image provided by a lens with the hair-cross of a reticule located in the plane of the image. Not only is the accuracy of this aim setting limited by the optical characteristics of the instrument, but also by the physiological qualities of the observer's eye. The measurements performed are affected by personal errors which render it necessary for a number of observers to complete several of such aim setting operations.

In order to eliminate such personal errors and carry out rapid measurements, novel microscopes, of the photoelectric aim setting type, have been devised. The principle of these instruments is substantially based on the use of a reticule or of a slit vibrating at a frequency $f$ in the plane of the image. The luminous flux is then received by a photoelectric receiver and the resulting electric current or output voltage is a periodical one and may be decomposed into a Fourier series with terms of frequency $nf$, where $n$ stands for all integer numbers. When the aiming operation has been achieved, i.e. when the mobile element vibrates symmetrically relative to the object, the resulting electric current or output voltage is a periodical one and decomposable into terms of a Fourier series of the frequency $2nf$.

FIG. 1 is a graphic comparison of slit displacement and photocell current.

FIG. 2 is a diagrammatic representation of slit movement compared with location of the discontinuity under examination.

FIGS. 3 and 4 represent two embodiments of arrangements for the vibrating device.

FIGS. 5 and 6 represent respectively two embodiments of the device of the invention.

Figure 6:
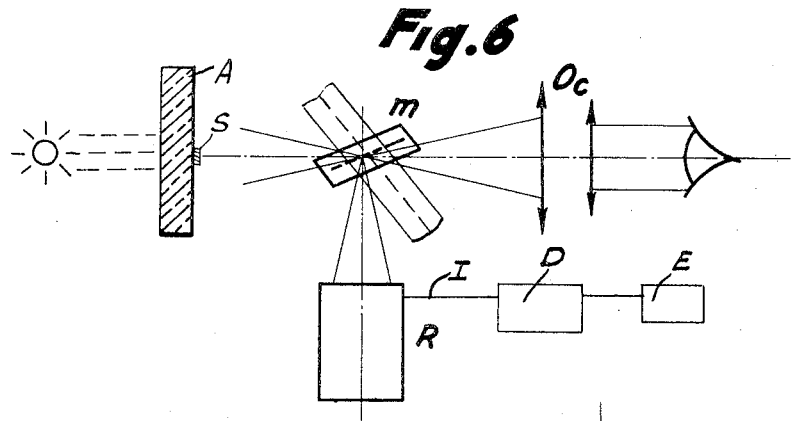

Reference is made, in this connection, to FIG. 1. The vibrating element carries out, for instance, a sinusoidal motion of an amplitude $X_0$ and of a period T (frequency $f = 1/T$). The position $x$ of this element at an instant $t$ is:

$$x = X_0 \cdot \sin(2\pi t/T)$$

If a thin slit, integral with this vibrating element, is scanning an object the transparency of which is represented by the function $I(X)$ possessed of an axis of symmetry, the resulting signal $I(t)$ will be obtained by plotting on abscissa $x$, for each value of $t$, the corresponding value of $I(X)$. This signal has a period $T/2$ when the object is scanned symmetrically (solid lines), with a period T when said object is off center by an amount of $\Delta X$ (broken lines).

A very simple diagram (FIG. 2) depicts in detail this later point. In a circle of center O and radius $X_0$, the axis OX is drawn perpendicular to the axis of symmetry $u'Ou$. A point M describes this circle as a function of time, the angle $$\widehat{Ou, MO}$$

being equal to $2\pi t/T$. The projection of OM on the axis OX is:

$$x = X_0 \cdot \sin(2\pi t/T)$$

Assuming that the object has an axis of symmetry dividing it into two identical portions I and II, when said axis crosses the center O of the circle, these two portions will be scanned each during an interval of time $T/2$; when the axis does not pass through O (off-center $\Delta X$), portions I' and II" are scanned in different periods of times, the scanning of the portions jointly taking place in an interval of time T.

In the known instruments based on such a principle, various vibrating electromechanical elements (i.e. transducers) were employed making use of the proeprties of the electric current subjected to a magnetic field—i.e. electromagnetic induction. In this connection, mirror galvanometers were employed the coil of which is suspended on a wire traversed by an alternating current; alternatively, a vibrating cord is used, traversed by an alternating current and subjected to a magnetic field. In order to determine a perfect centering, a frequency discriminator was also employed, emphasizing the fact that the fundamental frequency of the signal on centering is $2f$.

Yet according to the invention, for locating a line or the like, use is made of the equality of the scanning times on both sides of the axis of symmetry of the object by causing this scanning by means of an electrostatically coupled transducer, materialized by a piezo-electric ceramic element caused to vibrate by implementing the reverse piezo-electric effect. In the following, the expression "slit" designates any vibrating element put into effect according to the invention.

The photoelectric locating device consisting of a vibrating element, of a vibrating slit, of an object serving as a light source and illuminating said slit, of a photo-sensitive receiver responsive to said light beam and of means actuated by said receiver to determine or adjust the position of the object, comprises essentially, in accordance with the invention, a slit interlocked with a piezo-electric ceramic element, such as barium titanate or, preferably, a lead titanate and zirconate containing, polycrystalline material, means for applying to said element a periodic electric voltage so as to cause it to vibrate at the frequency of said voltage, and means for comparing the scanning times on both sides of a characteristic zone, which zone is either the axis of symmetry of the object, or any sudden irregularity of said object.

The crystalline or polycrystalline element may be used in the shape of an assembly of two bar members, plates or tubes, integral with the slit; the crystalline or polycrystalline element may also be employed in the shape of pre-polarized, bending-stressed ,rod elements, secured at one or at both of their ends and conveniently interlocked with the slit. A plurality of such elements, vibrating in phase or in phase opposition can be employed. These materials, and more particularly the lead titanate and zirconate containing polycrystalline elements possess very desirable characteristics for the development of the invention; in this shape, such ceramic materials, of high solidity, present a very high electromagnetic coupling coefficient and a dielectric constant which is also substantially high. An alternating electric voltage, of frequency $f$, applied to such a piezo-electric material causes therein a mechanical vibration of the same frequency. For a ceramic element of given dimensions, the amplitude $X_0$ of this vibration is a maximum when the frequency thereof—i.e. the frequency of the alternative voltage applied—is equal to the frequency of the mechanical resistance—or the resonance frequency—of the element.

According to the invention, this material may be used in various ways, either as a support for an opaque blanking element, or for a slit, reflecting mirror, or any other vibrating element; a device according to the invention may also be applied for locating lines on a rule and index marks on solid bodies, for measuring small deflection angels by means of an auto-collimating telescope or optics, for the aim-setting of multiple-wave or two-wave interference fringes, for measuring small phase-shifts in crystalline optics and in the polarimetric techniques etc.

It is vertified that the vibration amplitude is proportional to the electromagnetic coupling coefficient and to the electric load supplied to the ceramic material, or to the square of the length of the element utilized and to the voltage applied. Thus, the available voltage being laid down, on one hand, by the power of the frequency generator, and, on the other hand, in the case of a rod element pre-polarized by the depolarisation voltage, the choice of an amplitude range determines the choice of the rod length. This length, in turn, determines then the frequency to be utilized—i.e. the resonance frequency. It may be stressed that a lead-zirconate-titanate rod element, such as, for instance, the one manufactured under the trade name "PZT Multimorph" by the Brush Crystal Co. Ltd. having a length of about 30 mm., was subjected to a peak-to-peak 200 v. alternative voltage, at a frequency equal to the resonance frequency, i.e. 300 Hz., approximately. The vibration amplitude, $X_0$, obtained was of about 0.1 mm. The required electric input necessary for the production of such a vibration is very low and of the order of a few milliwatts. The low inertia of the whole system and the very reduced losses through thermic action result in the fact that the vibration is perfectly tuned in frequency with the input voltage and that no harmonics, nor any interharmonic beats are observed. The values of the frequencies used are such that the very faults inherent to electronic detection at low frequencies or at the mains frequency are negligible and it is thus not necessary to make use of a synchronous detector.

It will be readily seen that the device according to the invention presents reduced overall dimensions and a low weight, which is a great advantage and enables the device to be readily adapted to the existing visual apparatus, which was not the case with th known solutions mentioned hereinabove.

In FIG. 3, there is seen the utilization of an assembly of two piezoelectric longitudinally extendible rod elements, or plates or tubes, 1, 2, integral with a support 3 to which the vibration is transmitted. The shrinkage $b$ of one of the elements, accompanied by the expansion $a$ of the other element when alternating voltage is applied as shown, results in the rotation of support 3.

FIG. 4 shows a polarized rod element 4 working under bending, and which is commercially available. Similar to a bimetallic strip arrangement, its bending is due to the simultaneous action of a longitudinal compression along half the thickness and of a tensile stress along the other half. An A.C. voltage V applied to electrodes 6 of the element produced a vibration therein. The rod element may be secured at one of its end portions (FIG. 4), with the free end portion in mount 5 vibrating, or, alternatively, both ends may be fixed, the vibration being carried out by the central portion of the rod element.

FIG. 5 illustrates a schematic diagram of the principle of the simplest embodiment of the device. Objective or lens O forms the image of the line S of the object A which is illuminated by light sources L in the plane of the slit F integral with the vibrating element 1. The luminous flux transmitted through the slit F is received by receiver R which emits a signal I. Signal I is displayed on a display device D and is recorded on recorder E. FIG. 6 illustrates an alternative embodiment of the device of FIG. 5, having certain desirable advantages as compared with the latter. Object A is illuminated by light source L. The image of line S is formed on a small mirror $m$ integral with a vibrating element 1 directed at an angle of 45° relative to the optical axis. The luminous flux reflected back by the mirror $m$ at an angle of 90° with respect to said optical axis is received by receiver R. Receiver produces a current I which is fed to a display device D and a recorder E. The observation of the field remains possible in the direction of the optical axis through eye-piece $O_c$. This arrangement, besides having the advantage of the field observation, enables a visual pre-setting. Such arrangements apply both to transparent objects such as A illuminated through transmission, and to opaque objects illuminated through reflection. Unless a synchronous detector is being used, it is preferable to make use of D.C. supply for the light source.

The photoelectric receiver R utilized may be either a gas cell, or a photoresistant- or light-negative, or a photomultiplier cell assembly; alternatively, a silicium photodiode may be employed, which has desirable properties on account of its selectivity.

The lines which it is possible to aim with such an apparatus may be both dark on a clear background, or clear on a dark background and may be scanned both through a slit or through an opaque blanking arrangement. In a general manner, if the transparency of the object is represented by function I(X) and if the same is scanned by a vibrating element the transmission factor of which is F(X), at any instant $t$, the vibrating element occupying the position:

$$x = X_0 \cdot \sin(2\pi t/T)$$

the luminous flux received by the receiver will be represented by the integral:

$$I_0(X) = \int_{-\infty}^{+\infty} I(X) F(X-x) dx$$

In FIG. 1, the shape of the signal is shown, as obtained by scanning a clear object on a dark background through a very thin slit; it will be noted that, when aiming lines, the vibration amplitude $X_0$ should be at least equal to the width L of these lines.

The apparatus described enables to locate lines on graduated rulers, index marks on mechanical, optical and other solid materials and pieces.

Figure 7:
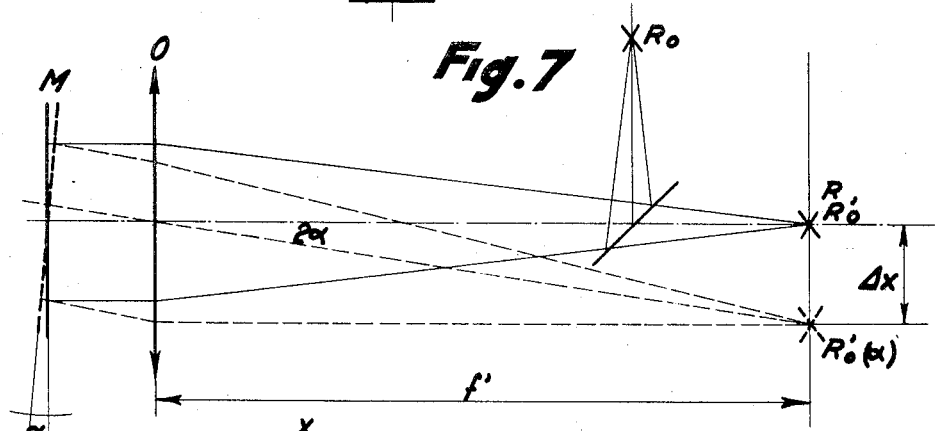
FIG. 7 is an optical diagram showing the application of the device to the measurement of a small deflection angle.

FIG. 7 illustrates an auto-collimating telescope or optics having a lens O, while operating the aiming of a mirror M. When the mirror is perpendicular to the optical image reflected $R'_o$ of the illuminated reticule, $R_o$ is confused with reticule R. If the normal to the mirror forms an angle $\alpha$ with the optical axis, the reflected image $R'_o(\alpha)$ of reticule $R_o$ is spaced apart from reticule R by an amount $\Delta x = 2f'\alpha$, where $f'$ is the focal distance of objective O.

The apparatus according to the invention enable the measurement of the deflexion $\Delta x$ and, in a more general way, of very small angles $\alpha$.

Under similar conditions, it is very easy to locate a field edge (for instance the limit of separation between two fields or zones, one clear and the other dark). In this case, the frequency discrimination criterion cannot be applied, but it is possible to make use of the criterion of the equality of the scanning times. This application is particularly interesting, since, if the apparatus is accompanied by a servo-system, it may then be used as a field edge follower and applied to automatic cutting of pieces of large size, such as, for instance metal sheets.

In all cases, the apparatus according to the invention enables the location of the object with an accuracy of at least an order of magnitude higher than the transversal aiming accuracy due to the dimensions of the diffraction spot provided by the objective of the microscope or of the auxiliary optical instrument utilized. If $\lambda$ is the wavelength of the light employed and $\Delta$ the diameter of the entrance pupil of the lens, the accuracy of the transversal aiming is commonly equal to $\lambda/\Delta$. With the apparatus of the invention, a precision of the order of $\lambda/10\Delta$ is readily attained.

Figure 8:
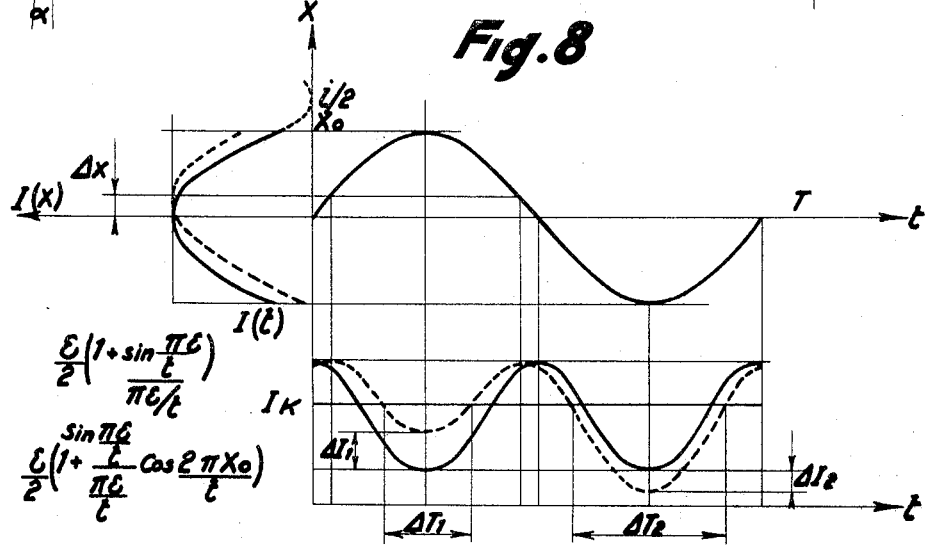
FIG. 8 illustrates the shape of the signal received when the apparatus of the invention is applied to aim-setting two-wave interference fringes.

Another application according to the invention is the possibility of aiming multiple- or double-wave interference fringes. FIG. 8 illustrates the shape of the signal received in the case of double-wave interference fringes, an object the intensity distribution of which may be represented by the function $$I(X) = 1/2 \cdot \left(1 + \cos \cdot \frac{2\pi X}{i}\right)$$

where $i$ is the inter-fringe. Only the case was illustrated, wherein the vibration amplitude $X_0$ of a slit of a width equal to $\epsilon$ is lower than half of the inter-fringe $i$. It is in fact the only interesting case, since the measuring sensitivity is optimum and does not present any large variations for a vibration amplitude ranging between the tenth and the third of an inter-fringe.

In this example, it is noted that an offset $\Delta x$ may be detected, either by estimating of the variation differentials of the signal $\Delta I_2 - \Delta I_1$, or by estimating the time interval differential $\Delta T_2 - \Delta T_1$ for a given signal level $I_K$. Another advantage of this application resides in that it is possible to utilize a comparatively wide slit; by way of example, it may be emphasized that the contrast of the signal obtained does not drop by more than 10% when using a slit of a width equal to a quarter inter-fringe, instead of a very narrow slit, whereas the average signal increases proportionally with the width of the slit.

Figure 9:
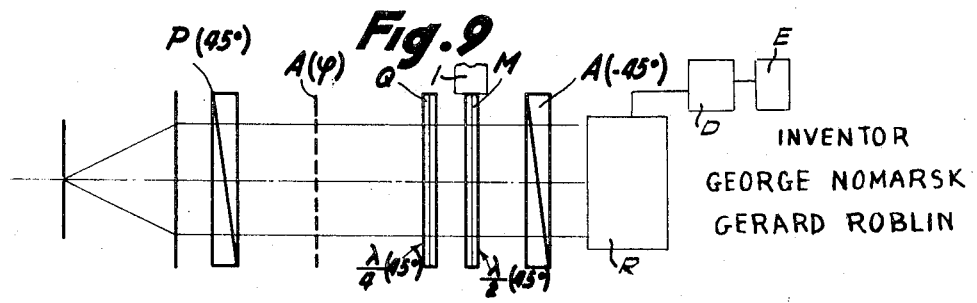
FIG. 9 represents an embodiment of a device for measuring small phase-shifts.
Figures 10, 11, 12:
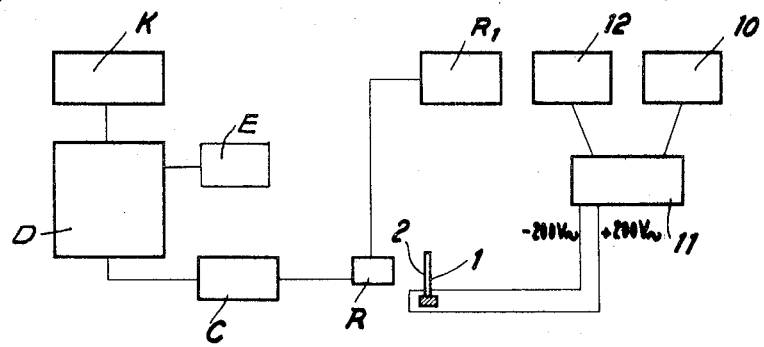
FIG. 10 shows diagrammatically half-wave reed vibrating device.
FIG. 11 is a block-diagram of an arrangement serving for elaboration of a signal occurring in an aiming or measuring operation.
FIG. 12 illustrates the various shapes assumed by the signal devised according to FIG. 11.

FIG. 9 shows a polarizer P followed by a so-called "Senarmont" compensator consisting of a quarter-wave plate Q of $\lambda/4$ and of an analyzer A the axis of which crosses that of the polarizer. The insertion of a bi-refringent object $A(\varphi)$ giving rise to a phase-shift $\varphi$ destroys the extinction and in order to reset the same, it is necessary to rotate the analyzer by an angle $\varphi/2$. The phase-shift measurement of $\varphi$ may be made visually, but the accuracy is limited to the estimating of the extinction by the observer. The arrangement of the invention enables in this case to obtain a greater precision and thus allows the measuring of much smaller phase-shifts $\varphi$ than those which it is possible to measure visually; to this effect, a half-wave plate M of $\lambda/2$ is added, the axes of which are parallel to the axes of the polarizer and of the analyzer; if this plate is made integral with the vibrating element 1-2 (FIG. 10), the axes describe a small rotation and at a given instant form with the direction of the analyzer and of the polarizer angles $$\alpha(t) = \alpha_0 \sin(2\pi t/T)$$

In the absence of any phase-shift, the signal is of the shape:

$$I_0(t) = N \sin^2 2\alpha(t)$$

while, during a phase-shift $\varphi$; it is of the form:

$$I\varphi(t) = N \sin^2 [2\alpha(t) - \varphi]$$

It is a signal of the same form than that obtained in the case of the preceding example and the detection of the phase-shift $\varphi$ is possible as was that of an offset $\Delta x$ by displaying the difference of two scanning times. A receiver R display device D and recorder E are used as in the previous examples. The element M is referred to as having a slit or several slits. Such an instrument may be adapted to flat-tint interferometers, and more particularly to polarization interferometers. It may therefore be applied with a great accuracy to small phase-shift measurements in crystalline optic, polarimetric and elasticimetric techniques, etc.

It was indicated hereinabove that most often the location criterion is the equality of the scanning times on both sides either of the symmetry axis of the object, or of its sudden irregularity (which is the case of the zone or field edge). The necessity of comparing the times $\Delta T_2$ and $\Delta T_1$ (FIG. 8) requires the production of a signal. Such a production is described hereinafter, with reference to FIG. 11: it presents no particular technical difficulties. A low frequency-generator 10 (0 to 500 Hz., for instance), followed by a voltage amplifier 11, energized at 12, provides, at a given frequency, two adjustable sinusoidal voltages, varying for instance from 0 to $\pm 200$ volts, which delivers a peak-to-peak voltage of 400 v. at a maximum. These two voltages are applied to the two ceramic plates 1, 2. The signal emitted by receiver R (with its power supply $R_1$) is introduced into a transistorized shaper C operating at a given signal level $I_K$.

In a first stage, the signal (FIG. 12a) is converted into rectangularly shaped signals (FIG. 12b), then it is differentiated (FIG. 12c). The insertion of a diode enables possibly to effect the differentiation for a single sign of the signal slope and improve the falling time of the peak obtained (FIG. 12d). The signal leaving the shaper C is then injected into an oscilloscope, either synchronized, or tripped, equipped with an electronic switch K, or of the triangular time-base type, which enables, under these conditions, to successively scan two sequential half- periods (FIG. 12e). A recorder E may be used as indicated. The aiming operation is effected when the two peaks, spaced apart by ½ ($\Delta T_2 - \Delta T_1$) (to within half a period), are superimposed. Such an electronic arrangement may be easily completed by any known means, for instance a recording or a servo-system, enabling automatic measurements to be effected.

What we claim is:

1. A uniformly vibrating piezoelectric crystal-operated photoelectric device for locating and centering a luminosity discontinuity of an object, comprising a base, an elongated piezoelectric ceramic element having one longitudinal end fixed on the base, a light blocking element fixed to a portion of the piezoelectric element remote from the base, the light blocking element having a light passing slit, whereby the piezoelectric ceramic element is integral with the light blocking element having the slit, a light source including an object having a luminosity discontinuity optically aligned with the light blocking element for illuminating said slit, a uniformly alternating voltage source means connected to the piezoelectric element for applying to said piezoelectric element a uniformly periodic electric voltage in such a manner as to cause the piezoelectric element to vibrate at a regular frequency of said voltage, photoelectric means optically aligned with the object and the slit for receiving discontinuous light rays issued from the light source through the slit and for producing first and second cyclic signals in response to received light rays, which signals are spaced apart according to first and second cyclic elapsed scanning times between successive discontinuities of light rays caused by luminosity discontinuity of the object, signal shaper means connected to the photoelectric means for receiving signals therefrom and for producing first and second shaped signals spaced apart according to the first and second scanning times, oscillograph display means connected to the shaper means for displaying the shaped signals and electronic switch means connected to the oscillograph display means for juxtaposing the signals for comparing first and second scanning times between sequential passes of the rays from the discontinuity through the slit the means for receiving, comparing and displaying being independent of the piezoelectric crystal voltage applying means.

2. A device according to claim 1, wherein the ceramic element is an assembly of two bars, integral with the slit.

3. A device according to claim 1, wherein the ceramic element is an assembly of two plates, integral with the slit.

4. A device according to claim 1, wherein the ceramic element is an assembly of two tubes, integral with the slit.

5. A device according to claim 1, wherein the ceramic element is an assembly of pre-polarized rods, secured at one of their end portions.

6. The device of claim 1, wherein the light blocking element having a light passing slit comprises a half-wave polarizer plate, and wherein the device further comprises means for polarizing light from the light source.

References Cited

UNITED STATES PATENTS

| | | | |
|---|---|---|---|
| 2,996,625 | 8/1961 | De Neergaard | 250—225 |
| 2,016,025 | 10/1935 | Scribner et al. | 350—269 |
| 2,137,188 | 11/1938 | Whitman | 179—100.3 |
| 2,848,921 | 8/1958 | Koulikovitch | 88—14 |
| 3,173,019 | 3/1965 | Wormser | 250—232 |
| 3,305,692 | 2/1967 | Girard | 250—232 X |
| 3,317,739 | 5/1967 | Larraburu et al. | 250—232 |

JAMES W. LAWRENCE, Primary Examiner

V. LAFRANCHI, Assistant Examiner

U.S. Cl. X.R.

250—225, 232; 350—269